(12) United States Patent
Chen et al.

(10) Patent No.: US 12,554,764 B2
(45) Date of Patent: Feb. 17, 2026

(54) METHODS AND SYSTEMS FOR OPTIMIZING DISPLAY OF USER CONTENT

(71) Applicant: Pixlee, Inc., San Francisco, CA (US)

(72) Inventors: Jeff Z. Chen, San Francisco, CA (US); Susan Willis, Petaluma, CA (US)

(73) Assignee: Pixlee, Inc., San Francisco, CA (US)

( * ) Notice: Subject to any disclaimer, the term of this patent is extended or adjusted under 35 U.S.C. 154(b) by 0 days.

(21) Appl. No.: 16/246,203

(22) Filed: Jan. 11, 2019

(65) Prior Publication Data

US 2020/0226168 A1 Jul. 16, 2020

(51) Int. Cl.

| | |
|---|---|
| *G06F 16/957* | (2019.01) |
| *G06F 16/43* | (2019.01) |
| *G06F 16/435* | (2019.01) |
| *G06F 16/438* | (2019.01) |
| *G06F 16/483* | (2019.01) |
| *G06F 40/295* | (2020.01) |
| *G06N 3/08* | (2023.01) |
| *G06N 20/00* | (2019.01) |
| *G06Q 30/0601* | (2023.01) |
| *G06Q 50/00* | (2012.01) |

(52) U.S. Cl.
CPC ......... *G06F 16/4393* (2019.01); *G06F 16/43* (2019.01); *G06F 16/435* (2019.01); *G06F 16/483* (2019.01); *G06F 16/9577* (2019.01); *G06F 40/295* (2020.01); *G06N 3/08* (2013.01); *G06N 20/00* (2019.01); *G06Q 30/0631* (2013.01); *G06Q 50/01* (2013.01)

(58) Field of Classification Search
CPC .......... G06F 16/24578; G06F 16/9535; G06F 17/2785; G06F 16/9038; G06Q 30/0631; G06Q 30/0623; G06Q 50/01; G06Q 30/0201; G06Q 10/063; G06Q 30/0255; G06N 3/08
See application file for complete search history.

(56) References Cited

U.S. PATENT DOCUMENTS

| | | |
|---|---|---|
| 8,122,020 B1 | 2/2012 | Donsbach et al. |
| 8,209,337 B2 | 6/2012 | Park |
| 9,569,700 B1 | 2/2017 | Santos et al. |
| 9,846,901 B2 | 12/2017 | Boston et al. |

(Continued)

FOREIGN PATENT DOCUMENTS

| | | | |
|---|---|---|---|
| AU | 2014233499 A1 * | 11/2015 | ............ G06F 16/22 |
| WO | 2020081873 A1 | 4/2020 | |

*Primary Examiner* — Marcin R Filipczyk
(74) *Attorney, Agent, or Firm* — Fredrikson & Byron, P.A.

(57) ABSTRACT

A method, system, and computer program product optimize display of user content, and include the features of selecting the user content for optimization of display, and processing one or more content properties associated with the user content. There are also the features of generating plural categories of the user content based upon categorization criteria, and providing the plural categories of the user content to an artificial intelligence model. There are also the features of associating a score with each of the plural categories of the user content by the artificial intelligence model, and generating a rank for each of the plural categories based upon the score associated with each of the plural categories. There is also the feature of optimizing the display of the user content based on an order of the rank of each of the plural categories.

20 Claims, 13 Drawing Sheets

(56) References Cited

U.S. PATENT DOCUMENTS

| | | |
|---|---|---|
| 9,984,386 B1 | 5/2018 | Bhatia |
| 10,043,137 B1 | 8/2018 | Jorgensen et al. |
| 10,121,171 B1 | 11/2018 | Chang et al. |
| 10,171,254 B2 | 1/2019 | Davis et al. |
| 10,185,898 B1 | 1/2019 | Folkens et al. |
| 10,217,120 B1* | 2/2019 | Shin .................. G06Q 30/0201 |
| 10,242,034 B1 | 3/2019 | Li et al. |
| 10,248,712 B1 | 4/2019 | Cheng |
| 10,546,352 B2 | 1/2020 | Systrom et al. |
| 10,885,545 B1 | 1/2021 | Menendez Gonzalez et al. |
| 10,956,948 B2 | 3/2021 | Mediratta et al. |
| 11,144,987 B2 | 10/2021 | DeLuca et al. |
| 11,410,418 B2 | 8/2022 | Rachidi et al. |
| 2004/0268137 A1 | 12/2004 | Kouznetsov et al. |
| 2009/0132526 A1 | 5/2009 | Park |
| 2012/0062596 A1 | 3/2012 | Bedi et al. |
| 2012/0269436 A1 | 10/2012 | Mensink et al. |
| 2012/0303545 A1 | 11/2012 | Brondstetter et al. |
| 2014/0006930 A1 | 1/2014 | Hollis et al. |
| 2015/0264093 A1 | 9/2015 | Madisch et al. |
| 2015/0281250 A1 | 10/2015 | Miller et al. |
| 2015/0363660 A1 | 12/2015 | Vidal et al. |
| 2016/0180438 A1 | 6/2016 | Boston et al. |
| 2016/0253719 A1 | 9/2016 | Akpala |
| 2016/0342863 A1 | 11/2016 | Kwon et al. |
| 2016/0343046 A1 | 11/2016 | Taguchi |
| 2017/0200183 A1 | 7/2017 | Lim |
| 2017/0262959 A1 | 9/2017 | Lee et al. |
| 2017/0270582 A1 | 9/2017 | Forss |
| 2017/0278135 A1 | 9/2017 | Majumdar et al. |
| 2017/0287058 A1 | 10/2017 | Pedram |
| 2018/0005526 A1 | 1/2018 | Sendhoff et al. |
| 2018/0068031 A1* | 3/2018 | Hewavitharana ... G06F 16/3329 |
| 2018/0137390 A1 | 5/2018 | Brundage et al. |
| 2018/0165728 A1 | 6/2018 | McDonald et al. |
| 2018/0182001 A1 | 6/2018 | Ghoshal et al. |
| 2018/0189857 A1* | 7/2018 | Wu .......................... G06F 40/30 |
| 2018/0260728 A1 | 9/2018 | Mathew et al. |
| 2018/0300295 A1 | 10/2018 | Maksak et al. |
| 2019/0005043 A1 | 1/2019 | Hemani et al. |
| 2019/0080207 A1 | 3/2019 | Chang et al. |
| 2019/0108561 A1* | 4/2019 | Shivashankar ...... G06V 40/103 |
| 2020/0045374 A1 | 2/2020 | Annadurai et al. |
| 2020/0126142 A1 | 4/2020 | Mohsin et al. |
| 2020/0226167 A1 | 7/2020 | Chen et al. |
| 2020/0226378 A1 | 7/2020 | Rachidi et al. |
| 2020/0226651 A1 | 7/2020 | Rachidi et al. |
| 2022/0179665 A1* | 6/2022 | Rathod .................... G06F 9/451 |
| 2023/0027530 A1* | 1/2023 | Jeganathan ........... G06F 16/951 |

* cited by examiner

SHARE YOUR ADVENTURE#ISLEsop

1000

LOAD MORE CONTENT

POWERED BY PIXLEE

FIG. 12

METHODS AND SYSTEMS FOR OPTIMIZING DISPLAY OF USER CONTENT

INTRODUCTION

This invention relates to the field of online content generation and promotion in general, and more specifically to methods and systems for online marketing and sales for products using user generated content.

Users, such as consumers of retail and other products have the capability to generate large volumes of content, such as, images, videos, texts, audios, etc., using several online channels available these days. Some of these online channels include social media pages of users, products, companies, and the like, blogs, dedicated webpages for product reviews and comparisons, online and brick-and-mortar advertisements, marketing materials such as marketing pages, brochures, pamphlets and the like, sales materials for different products and the like. All this online content may be broadly classified as user generated content (hereinafter also interchangeably referred to as "UGC"). All the sources of the different forms of user generated content form a part of an increasingly possible medium of marketing and business, commonly referred to as 'social commerce'.

Along with these sources and means of marketing and business, further advancements in online social media keep taking place at a rapid place, thus turning the tables on visual marketing for brands in a variety of areas. For example, with the influence of social media on user's buying patterns, it is becoming increasingly important to manage marketing materials in such a manner that they are able to leverage the user's reviews and ratings about a product for efficient brand management. As it may be seen that consumers are more likely to trust reviews posted by friends or others online, rather than the marketing materials posted by companies themselves and claims of brand representatives, thus is imperative that this form of UGC needs to be more actively incorporate in online marketing and content promotion activities of various companies.

A large number of social media users keep posting photos, videos, and other visual representations of the brands they use, enjoy, and trust, on online channels such as social media platforms, providing a continual source of valuable, publicly-available content. This material is not only useful for sharing experiences with 'friends' of these users, but may also be utilized by product companies and brands interested in connecting current and potential customers to real users' experiences, learning about their customer base, and addressing issues that develop in real-time, among other things. Hence, there exists a need to efficiently use social media content including processing the vast quantities of UGC and selecting useful content that may have not been available through any other sources for the purpose of marketing.

SUMMARY

A method, a system, and a computer program product disclosed herein optimize display of user content. In some example embodiments, a system for optimizing display of user content may be provided. The system may include at least one non-transitory memory configured to store computer program code instructions and at least one processor configured to execute the computer program code instructions to: select the user content for optimization of display, process one or more content properties associated with the user content, generate plural categories of the user content based on categorization criteria, provide the plural categories of the user content to an artificial intelligence model, associate a score with each of the plural categories of the user content by the artificial intelligence model, generate a rank for each of the plural categories of the user content based on the score associated with each of the plural categories of the user content, and optimize the display of the user content based on an order of the rank of each of the plural categories of the user content. The categorization criteria is based on the processed content properties. The artificial intelligence model is one of a neural network model, a nearest neighbor model, a k-nearest neighbor clustering model, a singular value decomposition model, a principal component analysis model, or an entity embeddings model.

In an embodiment, the processor may filter the user content to be optimized for display based on the rank of the user content. The user content may include one or more of an image, a text, an audio and a video on at least one social media platform associated with a user. The image may include a product image retrieved from a product catalog. The product catalog may be a fashion related product catalog. The categorization criteria may include number of pieces of user content and location of display of the user content. The processor may further generate the plural categories for the user content based on randomization of the user content within each of the plural categories of the user content.

In some example embodiments, a method for optimizing display of user content may be provided. The method may include: selecting the user content for optimization of display, processing one or more content properties associated with the user content, generating plural categories of the user content based on categorization criteria, wherein the categorization criteria is based on the processed content properties, providing the plural categories of the user content to an artificial intelligence model, associating a score with each of the plural categories of the user content by the artificial intelligence model, generating a rank for each of the plural categories based on the score associated with each of the plural categories of the user content, and optimizing the display of the user content based on an order of the rank of each of the plural categories of the user content.

In some example embodiments, a computer program product comprising at least one non-transitory computer-readable storage medium having stored thereon computer-executable program code instructions which when executed by a computer, cause the computer to carry out operations for optimizing display of user content, may be provided. The operations comprise: selecting the user content for optimization of display, processing one or more content properties associated with the user content, generating plural categories of the user content based on categorization criteria, wherein the categorization criteria is based on the processed content properties, providing the plural categories of the user content to an artificial intelligence model, associating a score with each of the plural categories of the user content by the artificial intelligence model, generating a rank for each of the plural categories based on the score associated with each of the plural categories of the user content, and optimizing the display of the user content based on an order of the rank of each of the plural categories of the user content.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
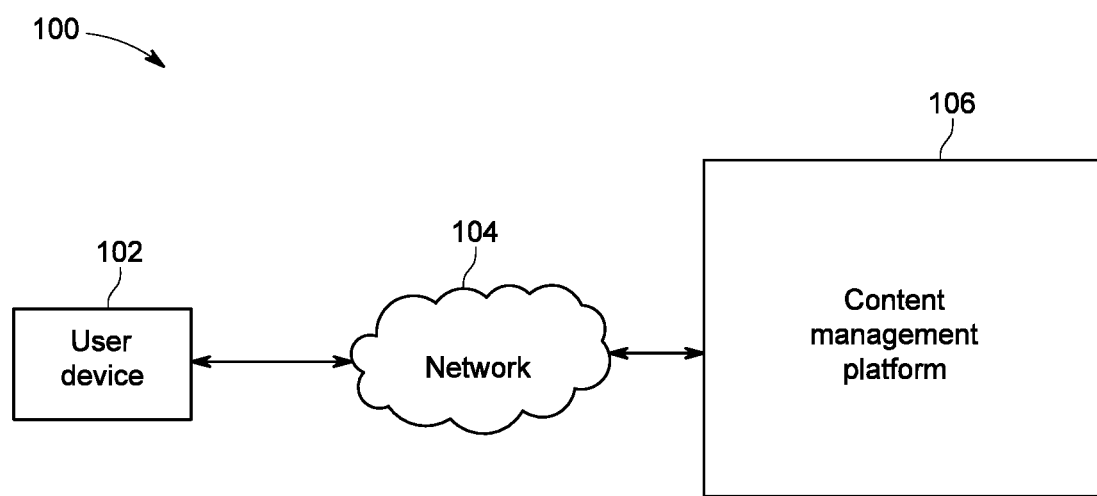
Figure 2:
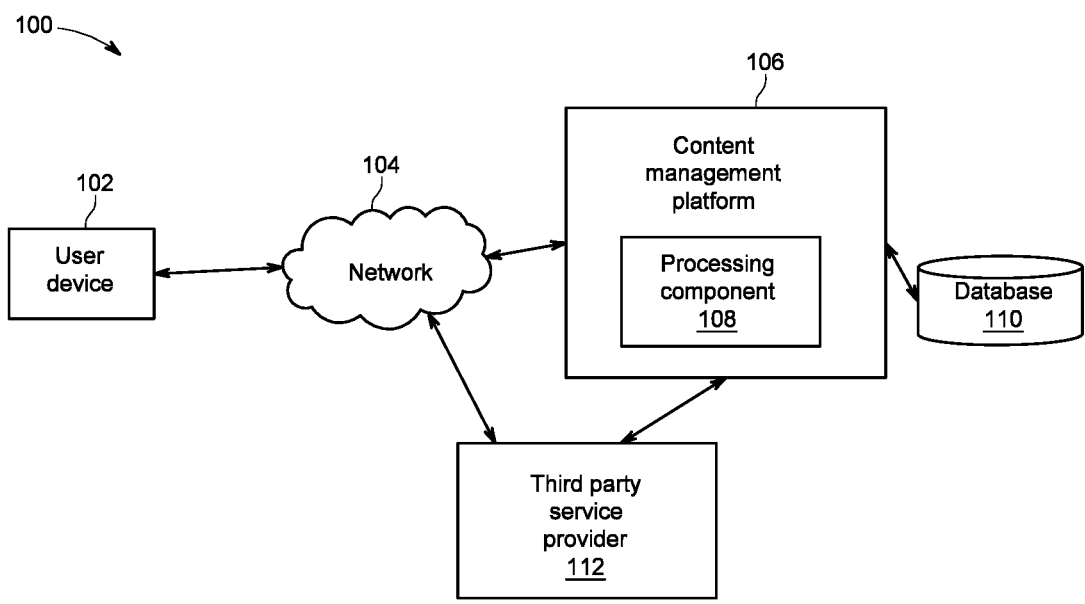
Figure 3:
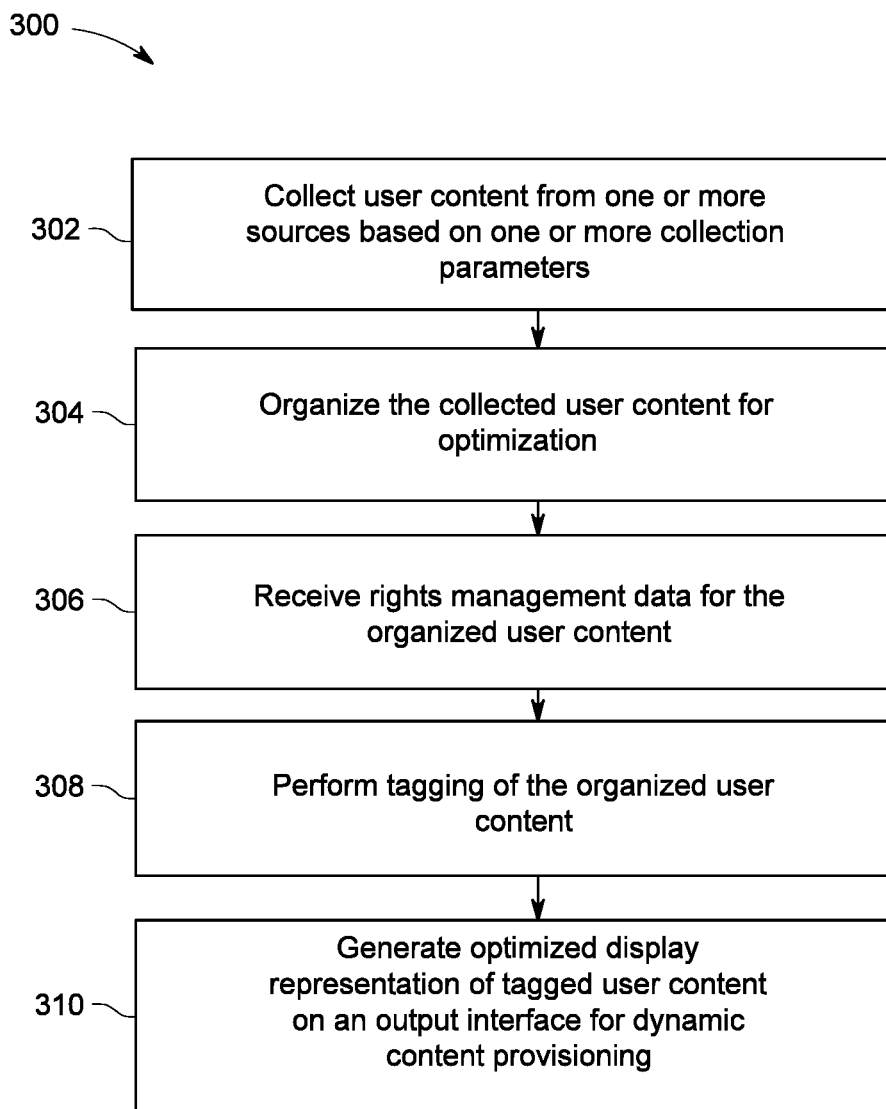
Figure 4:
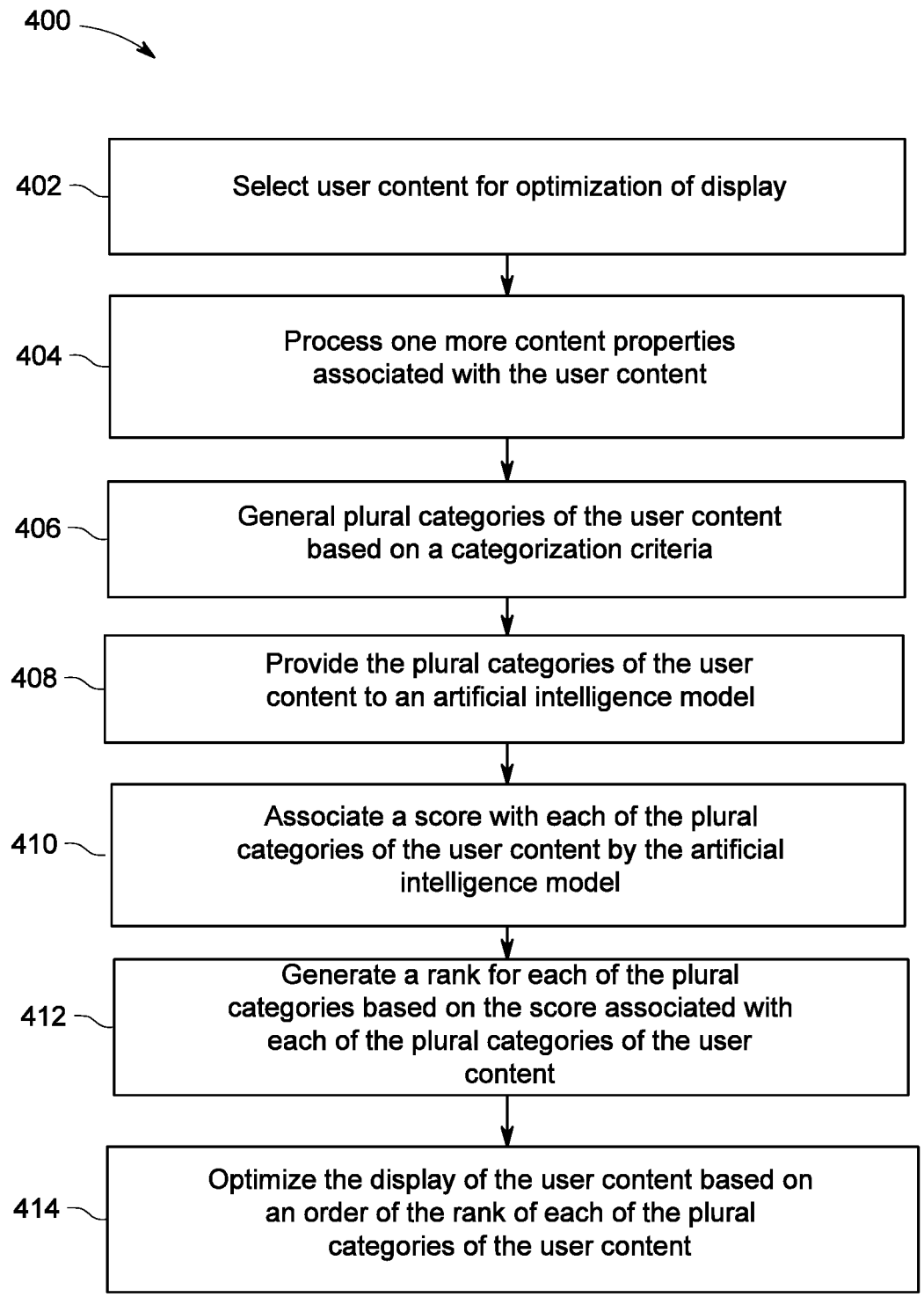
Figure 5:
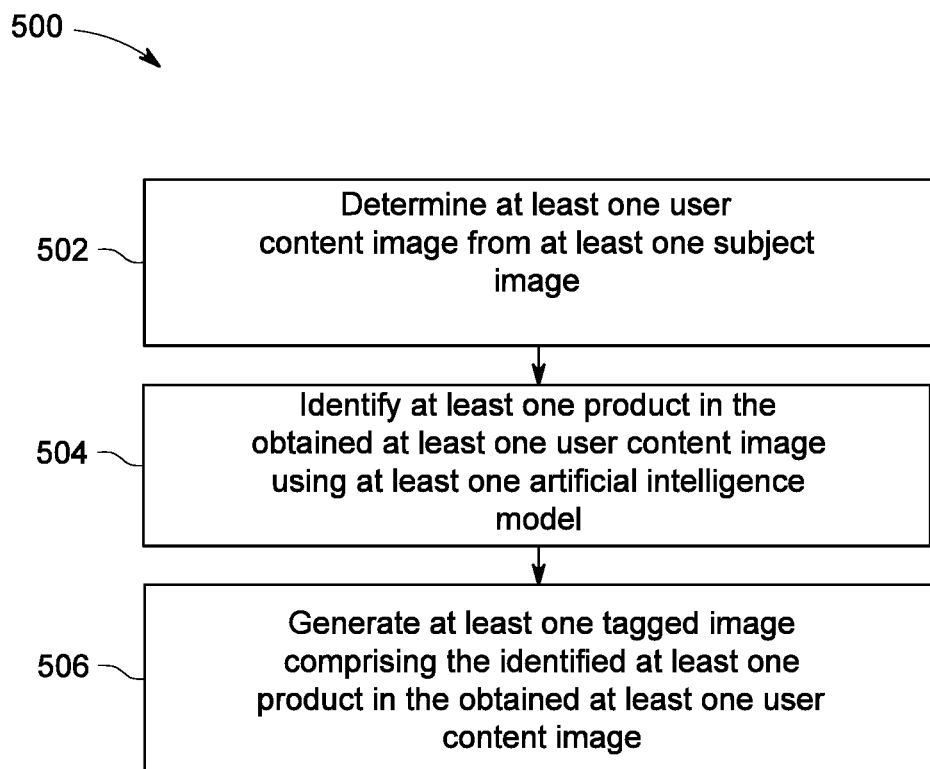
Figure 6:
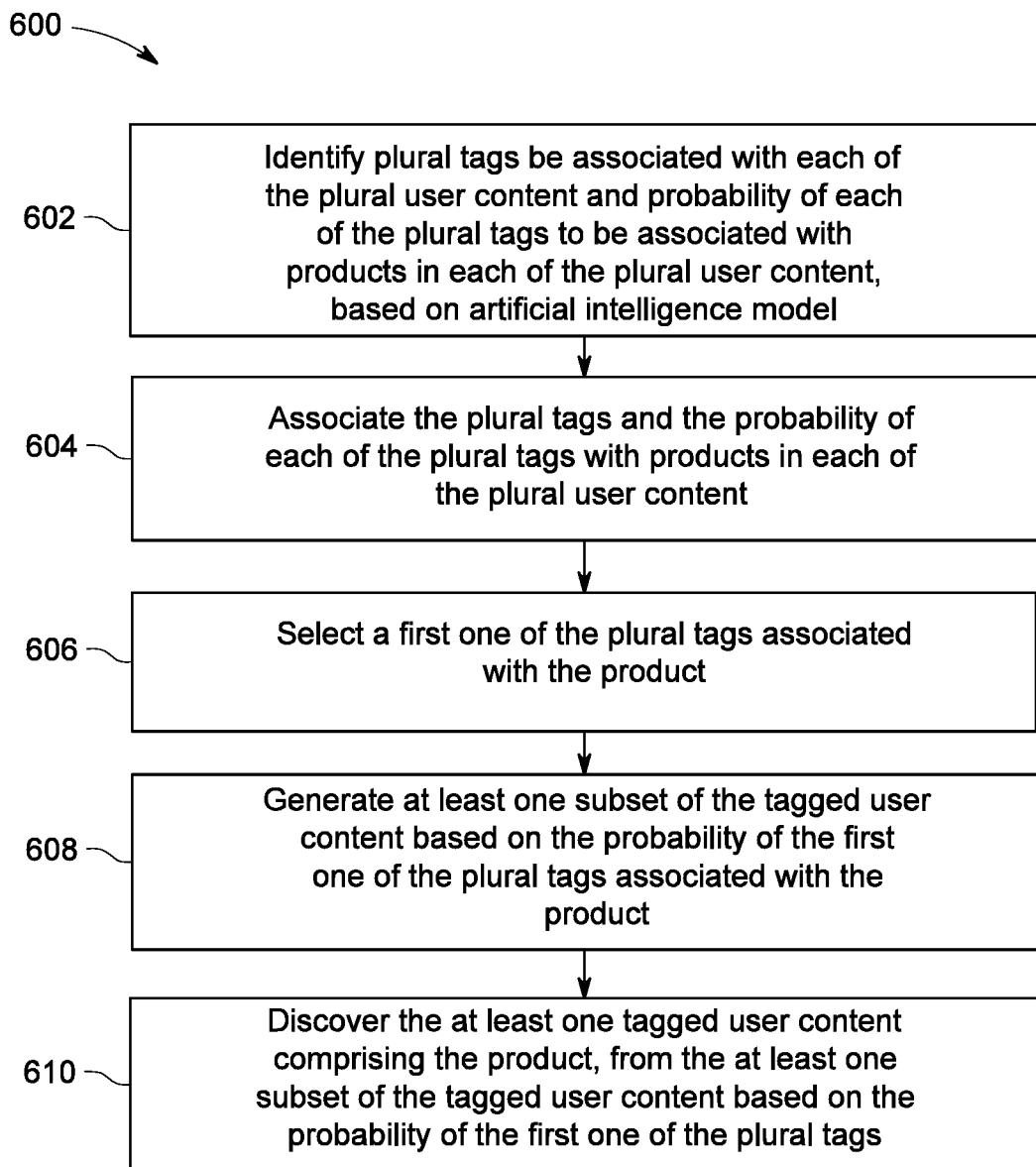
Figure 7A:
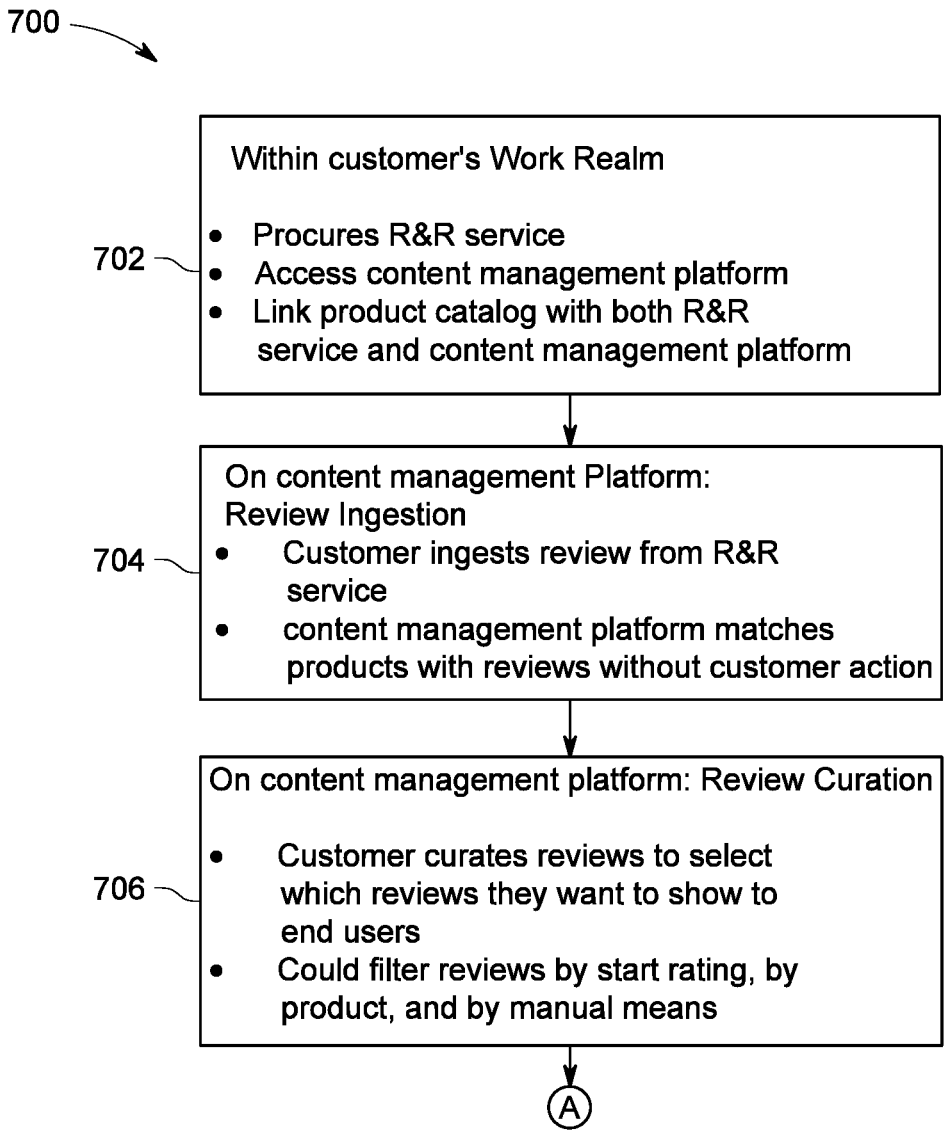
Figure 7B:
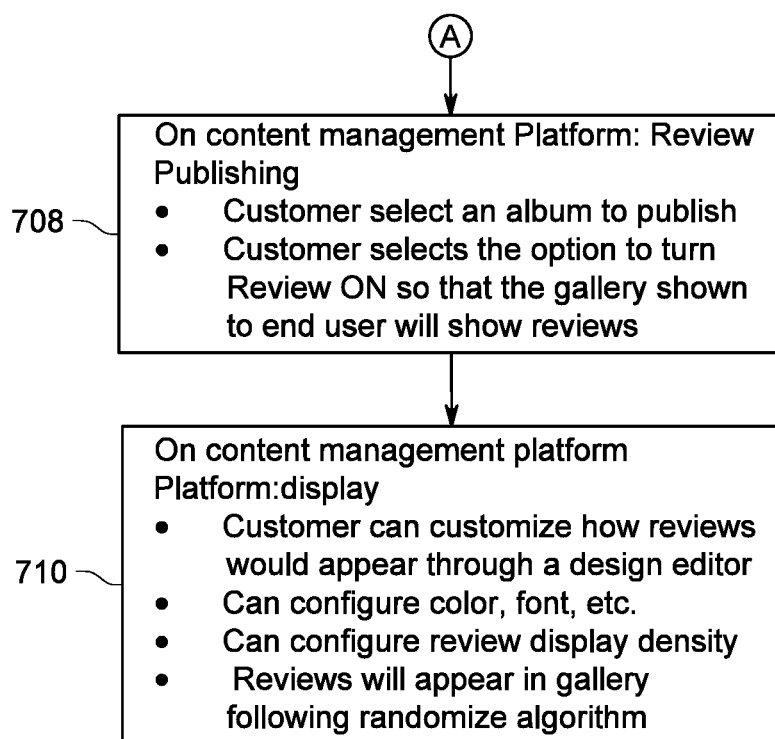

Having thus described example embodiments of the invention in general terms, reference will now be made to the accompanying drawings, which are not necessarily drawn to scale, and wherein:

FIG. 1 illustrates an exemplary block diagram of a system for dynamic content provisioning, optimizing user content for display, tagging images in the user content with products in the images, and associating products with images in the user content, in accordance with an exemplary embodiment;

FIG. 2 illustrates another exemplary embodiment of the system for dynamic content provisioning, optimizing user content for display, tagging images in the user content with products in the images, and associating products with images in the user content, in accordance with another exemplary embodiment of the present invention;

FIG. 3 illustrates an exemplary flow diagram of a method for dynamic content provisioning, in accordance with an exemplary embodiment;

FIG. 4 illustrates an exemplary flow diagram of a method for optimizing display of user content, in accordance with an exemplary embodiment;

FIG. 5 illustrates an exemplary flow diagram of a method for generating at least one tagged user content image, in accordance with an exemplary embodiment;

FIG. 6 illustrates an exemplary flow diagram of a method 600 for discovering at least one tagged user content comprising a product from a plural user content, in accordance with an exemplary embodiment;

FIGS. 7A-7B illustrate a method for ingestion, curation, publication, and display of user content performed by a content management platform, in accordance with an exemplary embodiment; and FIGS. 8-12 illustrate display representations comprising curated user content, in accordance with different exemplary embodiments.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the process described as the object of this invention comprises a methodology used for collecting, classifying, displaying, and optimizing User Generated Content from social media platforms. There are multiple components of this process, which will be described herein. Certain embodiments of the present invention may include, but are not limited to, the following components. Certain embodiments of the present invention may additionally contain only a subset of the following components.

The methods and the systems disclosed herein may provide an efficient and effective way to manage the vast amounts for UGC for product marketing, branding, and promotion purposes. The various embodiments of the invention disclosed herein may provide for sorting, identifying, collecting, and using UGC for online marketing and branding for various consumer related products and their associated companies (hereinafter referred to as clients) to utilize in online and in-store advertisements, marketing materials, decorations, or a variety of other media ways more useful than various ways known in the art. Further, the methods and the systems disclosed herein may allow clients to request and receive permissions to use UGC from original content creators (hereinafter referred to as creators), collect content into groups (hereinafter referred to as Albums), and post the chosen content on any media (website, in-store posters, etc.) having internet connectivity. Additionally, the methods and the systems disclosed herein may provide for assessment of relative performance of chosen content within the album, allowing for more informed and effective display of existing content and selection of new content by the clients.

FIG. 1 illustrates an exemplary block diagram of a system 100 including a content management platform 106 for dynamic content provisioning, optimizing UGC for display, tagging images in the UGC with products in the images, and associating products with images in the UGC, in accordance with an exemplary embodiment of the present invention. The UGC may be any type of content including images, videos, testimonials, tweets, blog posts, etc. that is created and posted by unpaid contributors on different platforms or third party websites that may be used for promotion of brands. The system 100 may include a user device 102 for enabling the user or client to access the content management platform 106 using a network 104. The user device 102 may be configured to enable the user to generate, view, post, read, compare, access, or share UGC related to various clients.

In some example embodiments, the user device 102 may include a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user device 102 may enable the user to view UGC posted about a product by the content management platform 106.

The content management platform 106 may be configured to collect, organize, sort, and display content related to various products using various media sources, which may include, but are not limited to social networking platforms, user profiles on social networking platforms, online photo sharing platforms, blogging and micro-blogging websites, and the like. For example, a user may post a review about a product by a specific brand, such as a bicycle, and along with a textual comment, may also post a photo of the bike on their profile page on a social networking platform. The content management platform 106, while organizing content related to the bike by this brand, may pull out user review data from the user profile and use it in providing a rating and/or a tag to the bike, for displaying on a user interface of the user device 102, such as when the user access a webpage associated with the bike on the content management platform 106. Thus, real-time data posting about the bike may be captured in a dynamic manner by the content management platform 106, and further this dynamic data posting and update may be provided to the user. The user may access the content management platform 106 over a network 104.

In some example embodiments, the network 104 may be wired, wireless, or any combination of wired and wireless communication networks, such as cellular, Wi-Fi, internet, local area networks, or the like. In some example embodiments, through the network 104, the user 102 may also be connected to some other websites, such as websites of third party service providers that may provide additional information about UGC, as will be explained in the embodiment illustrated in FIG. 2 disclosed herein.

FIG. 2 illustrates another exemplary embodiment of the system 100 including the content management platform 106 for dynamic content provisioning, optimizing UGC for display, tagging images in the UGC with products in the images, and associating products with images in the UGC, in accordance with another exemplary embodiment of the present invention. The embodiment of FIG. 2 additionally illustrates a processing component 108, that may be configured to perform one or more operations on the content managed by the content management platform 106, such as the UGC. In some example embodiments, the processing component 108 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. In some embodiments, the processing component 108 may include one or more processing cores configured to perform independently. A multi-core processor may enable multiprocessing within a single physical package. Additionally or alternatively, the processing component 108 may include one or more processors configured in tandem via the bus to enable independent execution of instructions, pipelining and/or multithreading. The various capabilities of the processing component 108 may enable the processing component 108 to perform various operations on the UGC, including, but not limited to collecting, optimizing, organizing, searching, sorting, indexing, rating, tagging, displaying, analyzing, and storing the UGC. The UGC may be stored in one or more databases 110 associated with the content management platform 106.

In some example embodiments, the content management platform 106 may be configured to retrieve UGC from third party service providers 112, such as social networking websites, rating servers, blogging and micro-blogging websites, photo-sharing websites, and the like. Using the UGC provided by the third party service providers 112, the content management platform 106 may be configured to enable dynamic content provisioning, optimizing UGC for display, tagging images in the UGC with products in the images, and associating products with images in the UGC, to the users accessing the content management platform 106 through the user device 102, such as illustrated in the methods of FIGS. 3-6 as discussed below.

FIG. 3 illustrates an exemplary flow diagram of a method 300 for dynamic content provisioning, in accordance with an exemplary embodiment of the present invention. The method 300 may include, at step 302, collecting UGC from one or more sources, such as, the social media platforms based on one or more collection parameters. The collection of the UGC may be done using content aggregation techniques, such as API calls, direct content upload, and the like. After aggregation, the UGC may be subjected to post-processing, based on native content properties. Such properties may include reverse geolocation identification, social performance metrics, and the like. In some example embodiments, artificial intelligence (AI) techniques may be used for performing enhanced post-processing operations, such as spam detection, visual object tagging and the like. Further, after collection and post-processing, at step 304, the UGC may be subjected to content organization, by sorting the UGC and performing content optimization. In some example embodiments, the sorting of the UGC may be based on AI techniques being used for predicting a performance score associated with the content, such as the UGC. Further, at step 306, various rights management data, such as permission data, may be obtained for the UGC. Rights management may refer to the process of attaining consent to use of the UGC via commenting threads on social media platforms with computational automation at scale. The right management data may be obtained using one or more of SMS agnostic mass right management, strict authentication, e-signatures, content permissioning flow via authentication through social platform and the like. The rights management data may be obtained as follows: a user of the content management platform 106, a brand marketer, may create rights request templates in the content management platform 106. The user may utilize such rights request templates in bulk to send rights management requests to selected UGC via content management platform 106 APIs. The content management platform 106 automatically checks for responses and matches the responses with predefined keywords which trigger rights management agreement between the content management platform 106 and the content owner. The content management platform 106 may further mark the organized user content as "permitted by the content owner".

Once desired permissions for using the UGC have been obtained, at step 308, the UGC which is already organized and permissible for use may be subjected to tagging. Such tagging may be done using AI assisted product tagging, such as for fashion catalogs, using a product search and selection tagging interface and the like. Further, after tagging, at step 310, an optimized display representation of the tagged UGC may be generated on an output interface of the user device 102 accessible to the user for dynamic content provisioning. Optimization of the display representation of the UGC may include processing content properties and running a representation of the UGC through an artificial intelligence model that scores the UGC appropriately. In some example embodiments, the display of the content may be managed using a WYSIWYG editor, for managing display style, and for providing custom display options for managing the UGC.

The display representation may be defined as an optimal order of UGC, and a cosmetic incarnation of the UGC. The cosmetic component of the display representation may include concepts, such as, horizontal filmstrips, photo walls, mosaics, live grids. Such display representations may be distributed electronically via web, in-store displays, email, mobile, etc. Customization of the display representation of the tagged UGC may also be possible via a display editor of the content management platform 106. The display editor may allow user of the content management platform 106 to edit look and feel of the display representation in a WYSIWYG manner. The editing may include component colors, fonts, sizes, spacing, call-to-action destinations (for example, a link to a product page to entice a shopper to convert to a buyer), and custom CSS. In some example embodiments, the display may be managed using a dynamic widget, using advanced filtration on the UGC and the like.

In some example embodiments, after display, the UGC may be subjected to further processing, such as collecting interaction data for the UGC. The interaction data may be such as live interaction data obtained through content views, interactions; live UGC conversion data, such as when product is added to cart, purchased and the like. Further, based on live interactions, the UGC may be scored and scoring may be dynamically updated based on live interaction data. For example, during a dynamic scoring methodology, top performing product photos may be weighted more that rest of the photos in a ratio of 90:10. The dynamic scoring may further enhance the capabilities of dynamic content provisioning method 300 discussed herein. The interaction data may include engagement metrics. Engagement metrics including, but not limited to, photo clicks, action link opens, conversions, etc., are collected for online instances of the displayed UGC. Additional information may be gathered from alternate print and display media forms, as well. The interaction data may be collected for each piece of UGC, to allow for further insight into top-performing UGC. The interaction data may be used to rank existing UGC, but new UGC is integrated into the scheme. This may be done by optimizing for several attributes of the UGC as it is collected; for example, object detection, performance data on the native platform, etc., indicates suitability of UGC for curation purposes. At this stage poorly performing UGC may be discarded, as well. Further, in some embodiments, the remaining UGC and new UGC may be directed back into the method, through the loop.

In some examples, dynamic content provisioning may also include additional pre-processing operations for UGC, before collecting the UGC A goal for optimization of the display representation may be obtained from the user, the brand marketers, of the content management platform 106. This may be the goal of the user of the content management platform 106 in collecting and using the UGC. For example, one goal may be to 'maximize engagement' but may also be focused on conversion, positive response to a website or product, or an entirely unrelated issue. The goals may include increased page engagement, higher time on site, higher click through, better conversion rate. A purpose for a media album or grouping criteria for grouping the UGC into media album is determined from the user of the content management platform 106. The purpose of the media album may include voting contests, inspiration galleries, homepage galleries, product and category showcases, etc. The UGC may be collected in groups called albums, to support components of the client's plan to utilize the UGC. Each of these albums may have its own selection criteria and content display algorithm associated with it. A search criteria for collecting the UGC from the social media platforms, may be defined separately for each album (though they may be utilized multiple times), and may be used to find appropriate UGC on social media platforms.

The UGC may be collected using automated search algorithms to scrape photos, videos, and other content from a variety of social media platforms, including but not limited to Facebook®, Instagram®, and Twitter®, according to the search criteria set by content parameters. The appropriate UGC may be selected for use in the media album. The UGC may be selected either manually or automatically, for inclusion in visual displays of the media album. In some example embodiments, a set of computer software may be used to make this process simple for the clients, if manual selection is used. If automatic, filters which may include computer vision, natural language processing, and other algorithms may be used to narrow the collected UGC into an optimal subset. Once the UGC is selected, permissions for UGC may be obtained. For each piece of UGC to be included in the group (album), permissions may be obtained from the original content creator on the origin social media platform. In some example embodiments, this may be performed through a piece of software which connects the client with the creator on the origin content management platform 106. Further, the UGC may be organized in the media album based on the goal for optimization and the purpose for the media album. That is, the UGC may be optimized for display. In some example embodiments, the content within the media album may be ranked through one of several processes and the resultant ranking may be used to determine content order when displayed. Since in many cases, only a few pieces of content may be displayed at once, ranking is important so that optimal content may be displayed. Content may be grouped based on the number of displayed pieces with each load, and randomized within the group. In some example embodiments, such content may be displayed across a variety of locations, both online and in brick-and-mortar stores, in print, etc.

FIG. 4 illustrates an exemplary flow diagram of a method 400 for optimizing display of UGC, in accordance with an exemplary embodiment of the present invention. The method 400 may include, at step 402, selecting the UGC for optimization of display and at step 404, processing one or more content properties associated with the UGC. The UGC may include such as an image selected from a product catalog. In some embodiments, the product catalog may be related to a fashion related product, such as clothes, jewelry, accessories and the like. The UGC may be generally grouped into albums during pre-processing of the UGC, which includes searching and selecting the UGC based on some user preferred criteria, such as search keywords, search categories, user preference prediction, and the like as disclosed in the detailed description of FIG. 3.

At step 406, the method may include generating plural categories of the UGC based on categorization criteria. The categorization criteria may be based on the processed content properties. The categorization criteria may include number of pieces of the UGC and location of display of the UGC on the output interface. At step 408, the method 400 may include providing the plural categories of the UGC to an artificial intelligence model and at step 410, associating a score with each of the plural categories of the UGC by the artificial intelligence model. The artificial intelligence model may be a neural network model, a nearest neighbor model, a k-nearest neighbor clustering model, a singular value decomposition model, a principal component analysis model, or an entity embeddings model.

Furthermore, at step 412, the method may include generating a rank for each of the plural categories based on the score associated with each of the plural categories of the UGC. In some example embodiments, user interaction data may be used to rank existing UGC, but new UGC is also integrated into the scheme. This may be done by optimizing for several attributes of the UGC as the UGC is collected; for example, object detection, performance data on the native platform, etc., indicates suitability of content for curation purposes. At this stage poorly performing UGC may be discarded, as well. In some example embodiments, ranking may be done dynamically, such that rank of each category and a score associated with the UGC may be altered dynamically. In some example embodiments, a multi-armed bandit algorithm may be used for dynamic ranking and scoring of the UGC.

At step 414, optimizing the display of the UGC based on an order of the rank of each of the plural categories of the UGC. For generating the plural categories of the UGC, the UGC may be randomized within each of the plural categories. The UGC may be displayed by category in order of category rank, using a random generation algorithm to determine display order for content within each category. For example, all UGC in category 1 may be shown before displaying any UGC in category 2, etc. Further, a completely random distribution of UGC may be tested alongside to get performance information and information about poorly performing UGC. Such UGC may even be discarded, in some exemplary embodiments. The display representation of the UGC may include "Hotspot" style lightboxes, improved customization of widget themes, and text reviews, etc. The method 400 may further include receiving interaction data on the optimized display of the plural categories of the UGC and ranking the plural categories of the UGC based on the received interaction data.

FIG. 5 illustrates an exemplary flow diagram of a method 500 for generating at least one tagged UGC image, in accordance with an exemplary embodiment of the present invention. The method 500 may include, at step 502, determining at least one UGC image from at least one subject image. The UGC image may be a subset of subject images. The UGC image may include products that are to be identified by the artificial intelligence model. The subject images may include all images posted online on different social media platforms. The UGC image may relate to, such as, image description, image utility, image reviews, image quality, and the like. In some example embodiments, the UGC image may be a product image, such as image of a product of a company, such as, a bike, a surf board, a skate board, a car and the like. In some embodiments, the UGC image may correspond to a product from a fashion catalog, such as a clothing line, accessories, jewelry items, shoes and the like.

In some embodiments, the UGC image may be an image associated with a call-to-action (CTA) component on a webpage. The CTA component may be provided to maximize user engagement with the webpage. Such a component may be a clickable component, such as a button or a link, instigating the user to perform some further action on the webpage. For example it may be "Know more" button, a "Download Now" link and the like. The subject image may be the image of the text or icon on such a component and may be associated with user content related to various metrics.

The method 500 may further include, at step 504, identifying at least one product in the obtained at least one user content image using at least one artificial intelligence model. The location and the identity of the products are identified in the UGC image. The locations of the products are within bounding box co-ordinates defined in the UGC image. In an embodiment, the bounding box may be drawn by the user of the content management platform 106 on the UGC image. The bounding box allows the artificial intelligence model to narrow the scope of search for a product in the UGC image. The artificial intelligence model may be already trained using product catalogs specific to the user of the content management platform 106. The artificial intelligence model is trained using training data. The training data includes images of products in a plurality of sample UGCs or a product catalog as an input to the artificial intelligence model and identity information of the products in the product catalog as an output of the artificial intelligence model. The training data is obtained from third party service provider websites 112 such as data crowdsourcing service providers, like, FigureEight, RapidWorkers, SamaSource, etc.

The artificial intelligence model is trained on samples of UGC images and images in sample product catalogs with labelled product information. The product information may be labelled based on: principal colors or key colors, for example, shown on a clothing item's image; categories of the products, such as, dress, boots, etc., gender of users to whom the products may cater, age of users to whom the products may cater, location of the products in the sample UGC images, visual similarity between different products, etc. The number of labels on a sample image may be greater than 1. The product catalogs are specific to each user of the content management platform 106, that is a customer of a brand, etc. A UGC image is input to at least 5 trained artificial intelligence models. The output of the trained artificial intelligence models is an identified scored list of products and locations of the products relevant to the input UGC image. Each of the trained artificial intelligence models gives output, such as, identifying a product in the UGC with 80% probability as a male, 75% probability that the product is dress, 11% probability the product is a hat, 70% probability that the product is blue in color, and 40% probability that the product is green in color, etc.

In an embodiment, the scored list of likely matching products in the UGC image with the products in the product catalog may vary based on the brand and/or the product catalog. The product catalog may be a fashion related product catalog, a travel and leisure related product catalog, a sports and equipment related product catalog, a health and beauty catalog, a consumer packaged goods catalog, or a home décor and furniture catalog. The artificial intelligence model may be a neural network, a nearest neighbor model, a k-nearest neighbor clustering model, a singular value decomposition model, a principal component analysis model, or an entity embeddings model. The neural network models may be convolutional neural network, recurrent neural network, Siamese neural network, etc. At step 506, the method 500 may include generating a tagged image comprising the identified product in the obtained user content image. Based on the scored list of the matching products, the UGC image is tagged with the matched products. The tagging ensures each UGC leads to a goal such as, call to action; making a reservation, buy a product, learn, enter a contest, etc.

FIG. 6 illustrates an exemplary flow diagram of a method 600 for discovering at least one tagged UGC comprising a product from a plural UGC, in accordance with an exemplary embodiment of the present invention. The method 600 may include, at step 602, identifying plural tags to be associated with each of the plural UGC and probability of each of the plural tags to be associated with products in each of the plural UGC, based on an artificial intelligence model. Tagged UGC images are obtained and the tagged UGC images associated with different products within them. The tagged UGC image may be such as an image of a product selected from a product catalog and the tag may be a product tag. Product tags may include information about products listed in a product catalog. A tag may describe some specific image properties related to the product. For example, in the case of a garment, the tag may describe the product as "soft", "cotton", "washable", "fit to size" and the like.

The tagged UGC images are further labelled by the artificial intelligence models. The labelling of the tagged UGC images involves adding metadata indicating probabilities of the tags to be associated with a product in the UGC images. The artificial intelligence models may output probabilities, such as, 75% confident that primary color in the product is RED, 60% confident that the product is a dress, etc. Further, at step 604, the method 600 may include associating the plural tags and the probability of each of the plural tags with products in each of the plural UGC. At least one artificial intelligence model performs mass tagging and labelling of the UGCs from the third party service providers 112 with products in a product catalog. Each product in the UGCs is associated with multiple tags. The artificial intelligence model may be a neural network model, a nearest neighbor model, a k-nearest neighbor clustering model, a singular value decomposition model, a principal component analysis model, or an entity embeddings model.

The method 600 may include, at step 606, selecting a first one of the plural tags associated with a product. At step 608, the method 600 may include generating at least one subset of the tagged UGC images based on the probability of the first one of the plural tags associated with the product and at step 610, the method 600 may include discovering at least one tagged UGC image comprising the product, from the subset of the tagged UGC images based on the probability of the first one of the plural tags. For a product, the library of the tagged UGC images is searched to obtain a subset of the tagged UGC images based on the probabilities of the tags being associated with the product. The subset can be ordered by probability ranks, and may be cut off by some probability threshold. From the subset of the tagged UGC images, at least one tagged image with the highest probability of a tag being associated with the product is discovered to comprise the product.

In an embodiment, the content management platform 106 may recommend a list of tagged UGC images that may contain the product and display such recommendations in an itemized manner on a user interface of the user device 102. The user of the content management platform 106 may manually select and confirm that the tagged UGC images comprise the product. The artificial intelligence model may be iteratively trained based on an association between each of the plural user content and each of the first one of the plural tags and the generated subset of the tagged UGC images.

Thus, using the methods 300, 400, 500, and 600 described in FIGS. 3-6, UGC may be used for devising efficient marketing and online dynamic content provisioning, using carefully filtered, scored and curated content metrics.

In an example embodiment, an apparatus for performing the methods 300, 400, 500, and 600 of FIGS. 3-6 above may comprise a processor configured to perform some or each of the operations of the methods of FIGS. 3-6 described previously. The processor may, for example, be configured to perform the operations (302-310), (402-414), (502-506), and (602-610) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (302-310), (402-414), (502-506), and (602-610) may comprise, for example, the processing module 108 which may be implemented as a separate module in system 100 and/or a device or circuit for executing instructions or executing the algorithms for processing information as described above.

FIGS. 7A-7B illustrate a method 700 for ingestion, curation, publication, and display of UGC performed by the content management platform 106, in accordance with an exemplary embodiment of the present invention. The method 700 may include, at step 702, procuring reviews and ratings constituting the UGC from content rating service providers and accessing the content management platform 106. The method 700 may further include, at step 702, linking product catalog with the procured reviews and ratings and the content management platform 106. At step 704, the user of the content management platform 106 may ingest reviews and ratings from the content rating service providers. At step 704, the content management platform 106 may match products with reviews in the UGC without interference of the user. At step 706, the user of the content management platform 106 curates reviews to select which reviews to display to the customers using the content management platform 106. The content management platform 106 may filter reviews by star rating, by product type, and by manual means. As exemplarily illustrated in FIG. 7B, at step 708, the user of the content management platform 106 may select an album to publish and the user of the content management platform 106 selects the option to turn on the review, in order that gallery shown to user of the content management platform 106 to show reviews. The design editor allows the user of the content management platform 106 to define the way reviews are to be displayed, such as, color and font.

At step 710, the user of the content management platform 106 may customize the way the reviews constituting the UGC may appear through the design editor of the content management platform 106. The user of the content management platform 106 may also configure review display density. The UGC may appear in the gallery following a randomization algorithm. The review display density may be referred to the number of reviews, or the UGC that can fit into the display area. The visual tiles with UGC images may be mixed with review tiles as exemplarily illustrated in FIG. 8 and FIG. 10. The tile opacity may be adjusted. Based on the output interface, the text in the UGC may be displayed on medium and large tiles.

Figure 8:
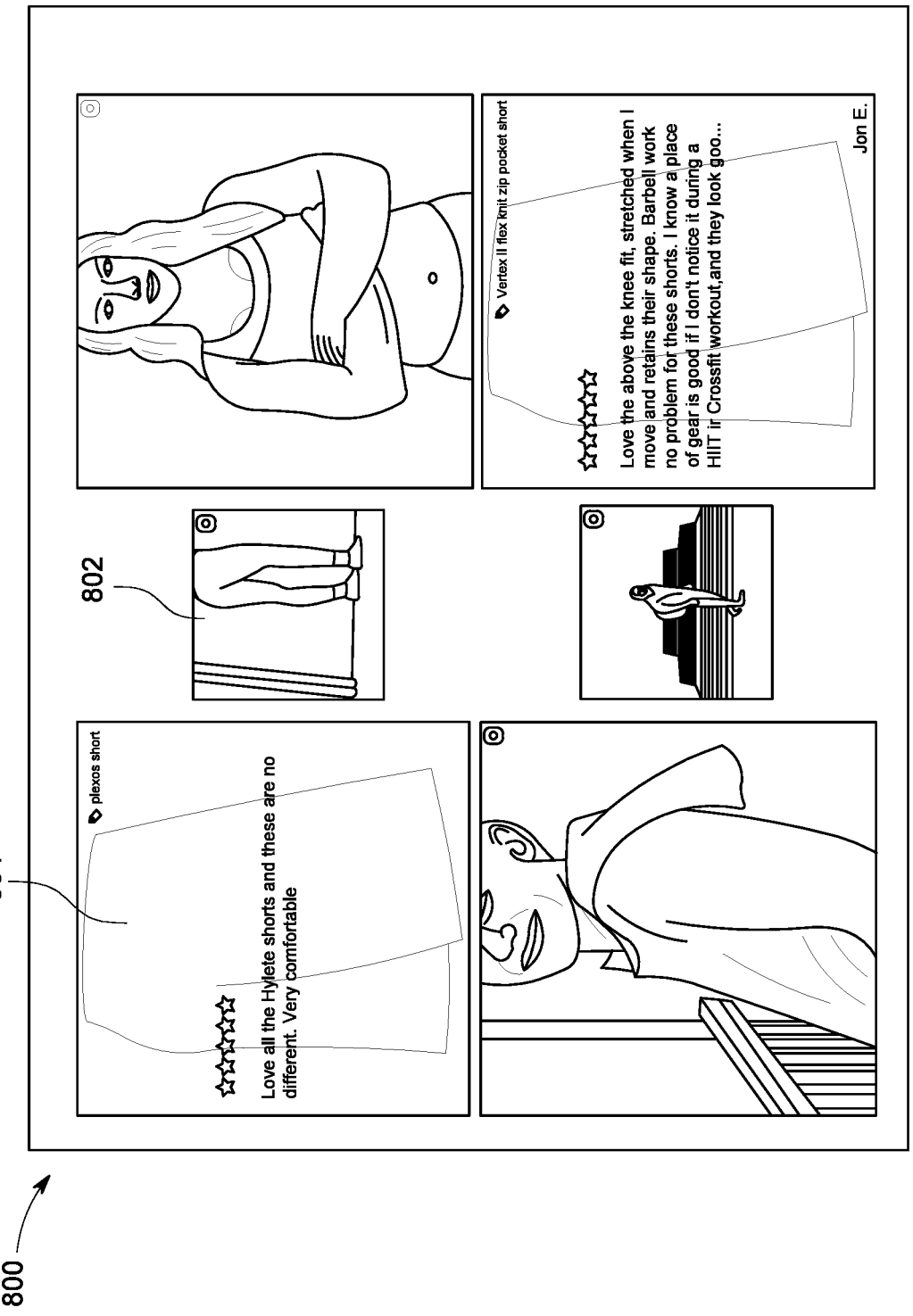
Figure 9:
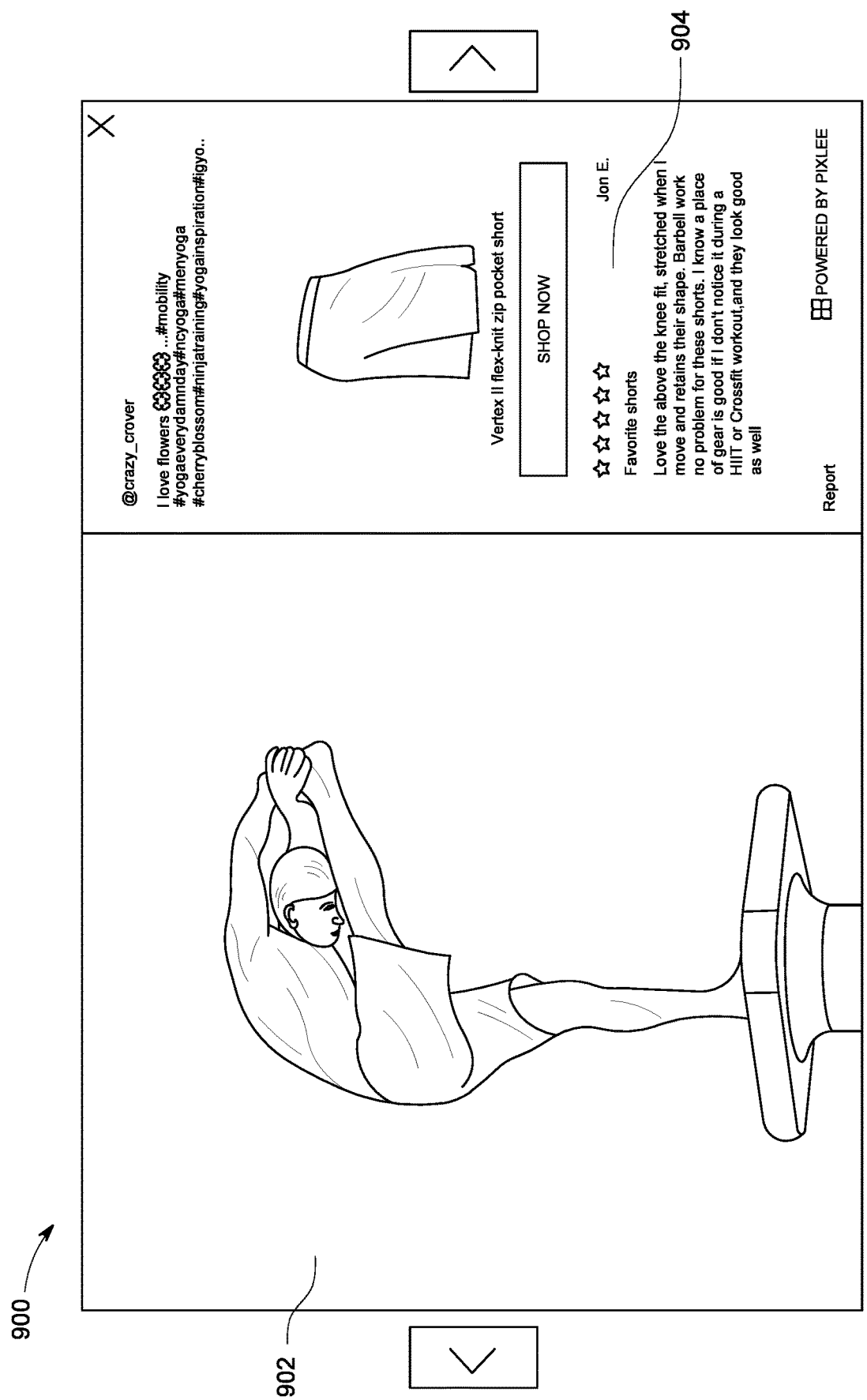
Figure 10:
Figure 10:
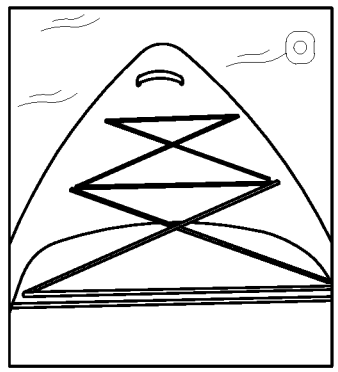
Figure 10:
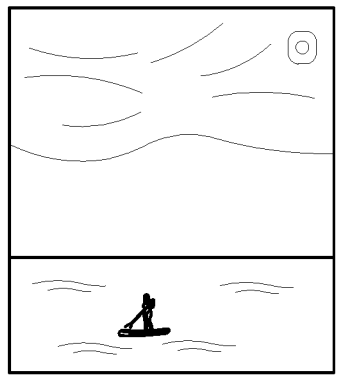
Figure 10:
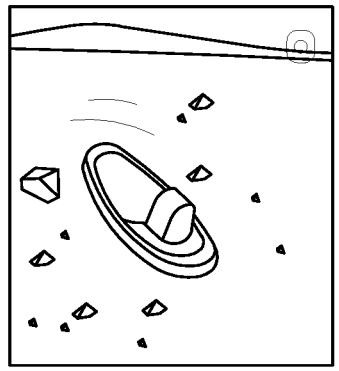
Figure 10:
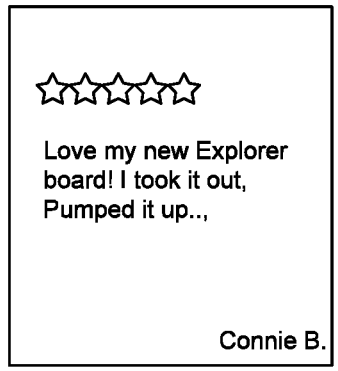
Figure 10:
Figure 10:
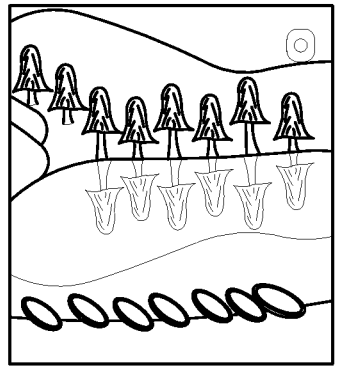
Figure 10:
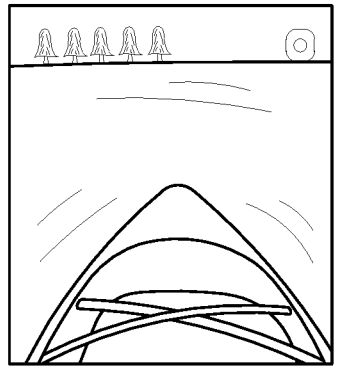
Figure 10:
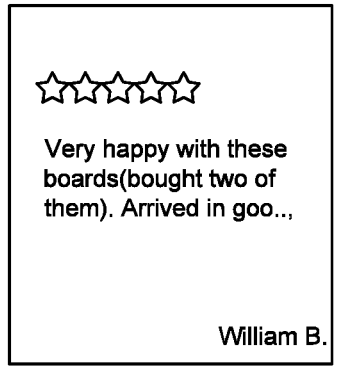
Figure 11:
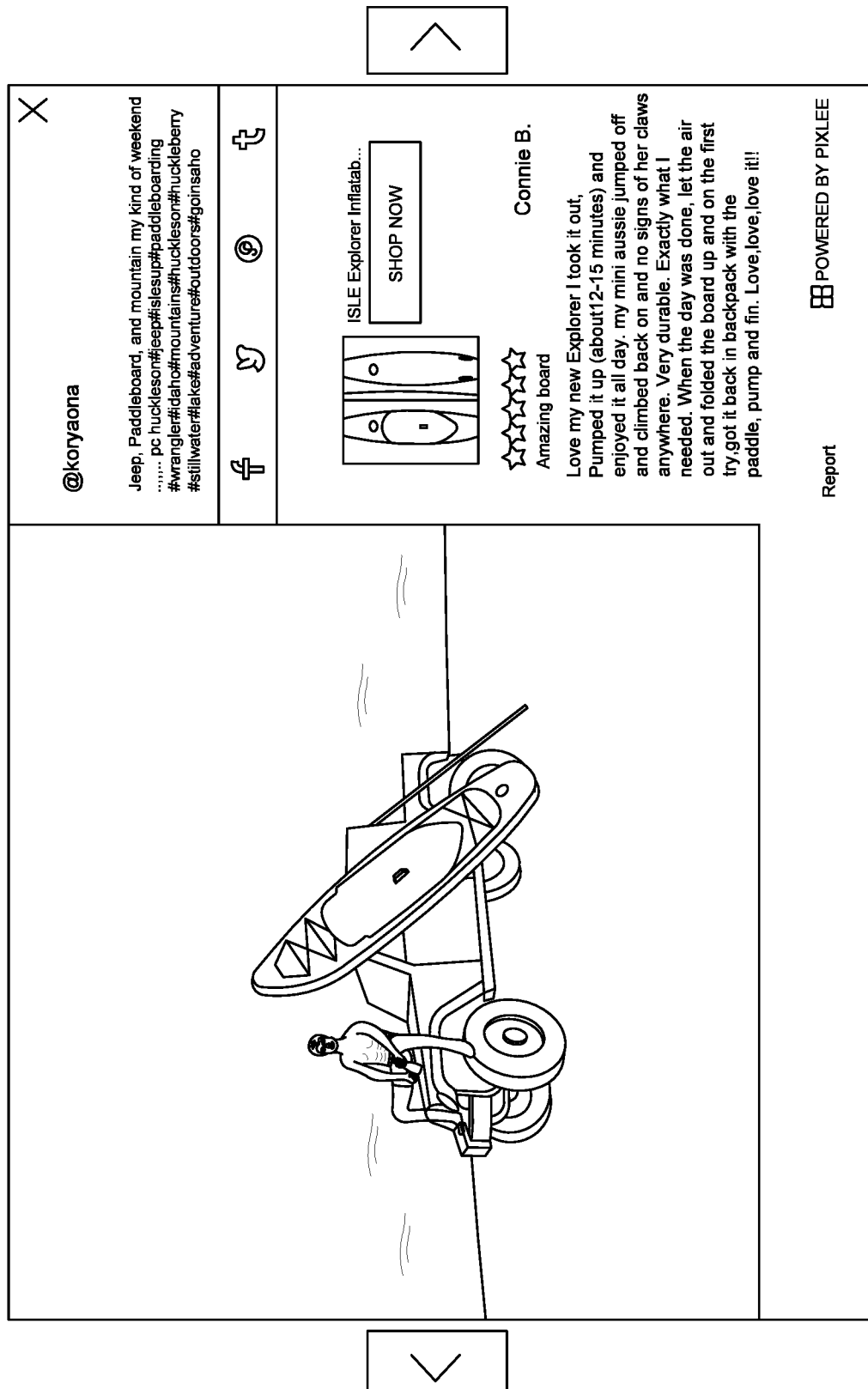
Figure 12:
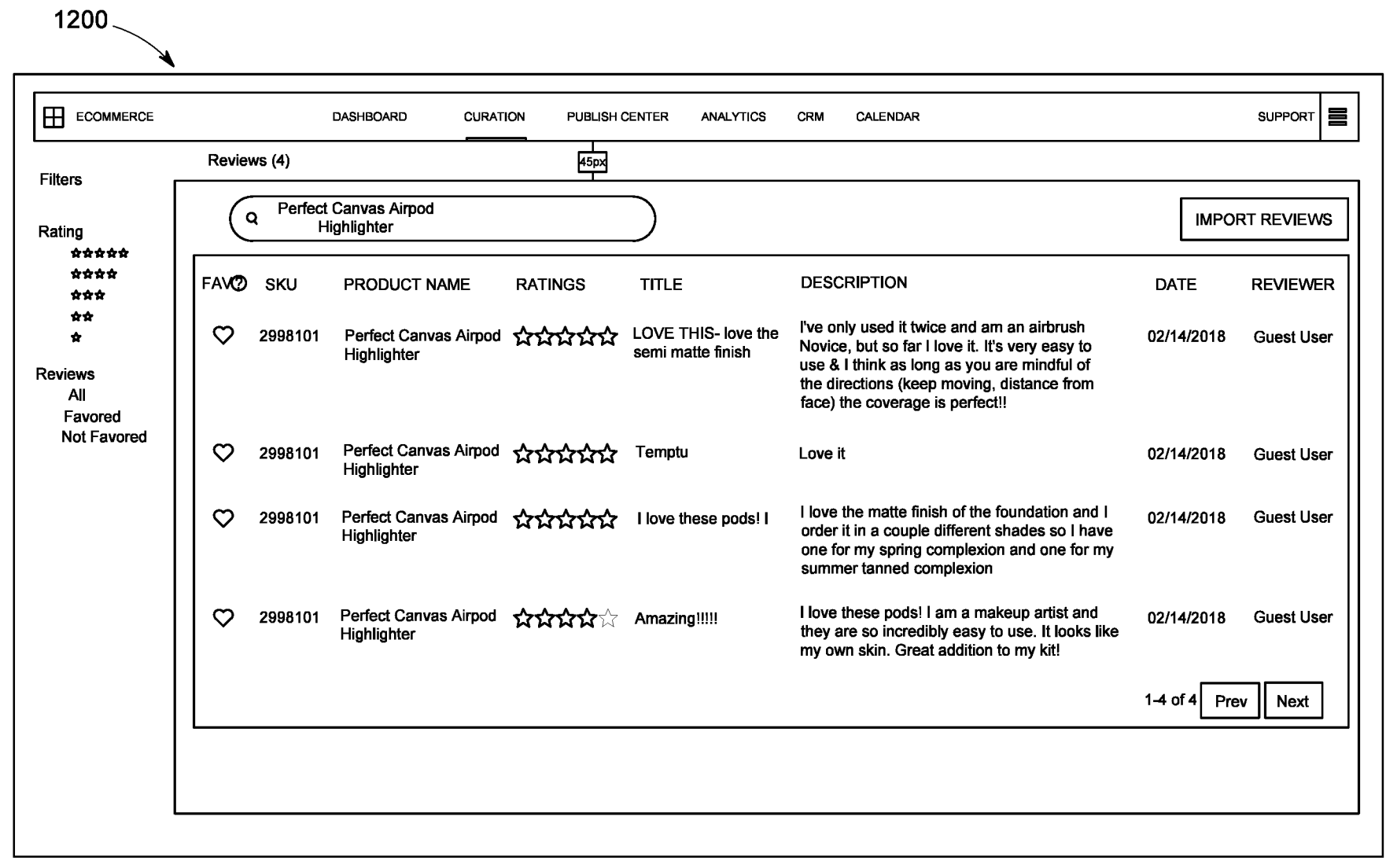

FIGS. 8-12 illustrate display representations comprising curated UGC, in accordance with different exemplary embodiments. FIG. 8 illustrates an exemplary display representation 800 in which visual tiles, such as visual tile 802, and textual tiles containing a product review, such as tile 804 may be displayed together to provide a gallery of product reviews. FIG. 9 illustrates another exemplary representational layout 900 for presenting visual tile 902 and text tile 904 for product reviews in a side-by-side manner, thus having a different review density. FIGS. 10-11 are other exemplary display representations 1000 and 1100 respectively illustrating different embodiments for presenting curated UGC. FIG. 12 illustrates an interface 1200 generated by the content management platform allowing curation, publication, and analytics on reviews constituting the UGC The interface 1200 allows importing of reviews from other review and rating service providers, manage star ratings of products, and specify filters for review publishing and the like.

The methods and systems set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and sub combinations of the various elements, features, functions, and/or properties disclosed herein. The following claims particularly point out certain combinations and sub combinations regarded as novel and nonobvious. Inventions embodied in other combinations and sub combinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

What is claimed:

1. A method for optimizing for a better conversion rate from shoppers to buyers display of user content that concerns a product, comprising:
analyzing, by at least one artificial intelligence model, at least one user content image to identify a product depicted in the user content image, wherein the artificial intelligence model outputs a location of the product within the user content image as bounding box coordinates and a catalogue identifier for the product;
generating, for the at least one user content image, an overlay tag comprising the catalogue identifier and the bounding box coordinates, and displaying the overlay tag with the image;
selecting product-recognition user content for optimization of display;
processing one or more content properties associated with the user content;
generating plural categories of the user content based on categorization criteria, wherein the categorization criteria is based on the processed content properties, and wherein the user content includes user preference that is based upon a user's previous selection choices;
randomizing the user content within each of the plural categories;
providing the plural categories of the user content to an artificial intelligence model;
associating a score with each of the plural categories of the user content by the artificial intelligence model;
generating a product-recognition rank for each of the plural categories based on the score associated with each of the plural categories of the user content;
filtering the user content to be optimized for display by using the product-recognition ranking of the user content;
optimizing the display of the user content based on an order of the product-recognition rank of each of the plural categories, which order relies on the filtering;
receiving interaction data on the optimized display of the plural categories of the user content, the received interaction data including at least one engagement metric, and wherein the at least one engagement metric includes a metric for conversions from shoppers to buyers of the product; and
ranking the plural categories of the user content based on the received interaction data.

2. The method of claim 1, wherein the user content comprises one or more of an image, a text, an audio and a video on at least one social media platform associated with a user.

3. The method of claim 2, wherein the image comprises a product image retrieved from a product catalog.

4. The method of claim 3, wherein the product catalog is a fashion related product catalog.

5. The method of claim 1, wherein the categorization criteria comprises a number of pieces of the user content and location of display of the user content.

6. The method of claim 1, wherein the artificial intelligence model is one of a neural network model, a nearest neighbor model, a k-nearest neighbor clustering model, a singular value decomposition model, a principal component analysis model, or an entity embeddings model.

7. The method of claim 1, wherein the bounding box coordinates are at least partially defined by a user of the content management platform.

8. The method of claim 1, wherein the artificial intelligence model is trained using product images from a product catalog specific to a brand or client.

9. The method of claim 1, wherein the artificial intelligence model identifies a plurality of products in the user content image, and outputs a corresponding plurality of bounding box coordinates and catalogue identifiers.

10. The method of claim 1, wherein the overlay tag further comprises a call-to-action element configured to enable a user to initiate a purchase or obtain additional information about the identified product.

11. The method of claim 1, wherein the artificial intelligence model performs product identification and bounding box generation in real-time on a user device.

12. The method of claim 1, wherein the user content image is obtained from a social media platform and the overlay tag is displayed within the social media platform's user interface.

13. The method of claim 1, wherein the overlay tag further comprises a confidence score indicating the likelihood that the identified product matches the product depicted in the image.

14. A system for optimizing display of user content that concerns a product, wherein the optimizing is for a better conversion rate from shoppers to buyers of the product, the system comprising:
at least one non-transitory memory configured to store computer program code instructions; and
at least one processor configured to execute the computer program code instructions to:
analyze, using at least one artificial intelligence model, at least one user content image to identify a product depicted in the user content image, wherein the artificial intelligence model outputs a location of the product within the user content image as bounding box coordinates and a catalogue identifier for the product;
generate, for the at least one user content image, an overlay tag comprising the catalogue identifier and the bounding box coordinates, and displaying the overlay tag with the image;
select product-recognition user content;
process one or more content properties associated with the user content;
generate plural categories of the user content based on categorization criteria, wherein the categorization criteria is based on the processed content properties, and based on randomization of the user content within each of the plural categories of the user content, and wherein the user content includes user preference that is based upon a user's previous selection choices;
provide the plural categories of the user content to an artificial intelligence model;
associate a score with each of the plural categories of the user content by the artificial intelligence model;
generate a product-recognition rank for each of the plural categories of the user content based on the score associated with each of the plural categories of the user content;

filter the user content to be optimized for display by using the product-recognition rank of the user content;

optimize the display of the user content based on an order of the product-recognition rank of each of the plural categories, which order relies on the filtering;

receive interaction data on the optimized display of the plural categories of the user content, the received interaction data including at least one engagement metric, and wherein the at least one engagement metric includes a metric for conversions from shoppers to buyers of the product; and rank the plural categories of the user content based on the received interaction data.

15. The system of claim 14, wherein the content comprises one or more of an image, a text, an audio and a video on at least one social media platform associated with a user.

16. The system of claim 15, wherein the image comprises a product image retrieved from a product catalog.

17. The system of claim 16, wherein the product catalog is a fashion related product catalog.

18. The system of claim 14, wherein the categorization criteria comprises number of pieces of user content and location of display of the user content.

19. The system of claim 14, wherein the artificial intelligence model is one of a neural network model, a nearest neighbor model, a k-nearest neighbor clustering model, a singular value decomposition model, a principal component analysis model, or an entity embeddings model.

20. A computer program product comprising at least one non-transitory computer-readable storage medium having stored thereon computer-executable program code instructions which when executed by a computer, cause the computer to carry out operations for optimizing display of user content that concerns a product, wherein the optimizing is for a better conversion rate from shoppers to buyers of the product, the operations comprising:

analyzing, using at least one artificial intelligence model, at least one user content image to identify a product depicted in the user content image, wherein the artificial intelligence model outputs a location of the product within the user content image as bounding box coordinates and a catalogue identifier for the product;

generating, for the at least one user content image, an overlay tag comprising the catalogue identifier and the bounding box coordinates, and displaying the overlay tag with the image;

selecting product-recognition user content;

processing one or more content properties associated with the user content;

generating plural categories of the user content based on categorization criteria, wherein the categorization criteria is based on the processed content properties, and wherein the user content includes user preference that is based upon a user's previous selection choices;

randomizing the user content within each of the plural categories;

providing the plural categories of the user content to an artificial intelligence model;

associating a score with each of the plural categories of the user content by the artificial intelligence model;

generating a product-recognition rank for each of the plural categories of the user content based on the score associated with each of the plural categories of the user content;

filtering the user content to be optimized for display by using the product-recognition ranking of the user content;

optimizing the display of the user content based on an order of the product-recognition rank of each of the plural categories, which order relies on the filtering;

receiving interaction data on the optimized display of the plural categories of the user content, the received interaction data including at least one engagement metric, and wherein the at least one engagement metric includes a metric for conversions from shoppers to buyers of the product; and ranking the plural categories of the user content based on the received interaction data.

\* \* \* \* \*